(12) United States Patent
Trieb

(10) Patent No.: US 7,628,267 B2
(45) Date of Patent: Dec. 8, 2009

(54) INSTALLATION FOR CONVEYING GOODS

(75) Inventor: Herbert Trieb, Lochau (AT)

(73) Assignee: Innova Patent GmbH, Wolfurt (AT)

( * ) Notice: Subject to any disclaimer, the term of this patent is extended or adjusted under 35 U.S.C. 154(b) by 27 days.

(21) Appl. No.: 11/958,984

(22) Filed: Dec. 18, 2007

(65) Prior Publication Data

US 2009/0127077 A1    May 21, 2009

(30) Foreign Application Priority Data

Nov. 15, 2007   (AT) .............................. A 1855/2007

(51) Int. Cl.
*B65G 21/20* (2006.01)
(52) U.S. Cl. ...................... 198/839; 198/845
(58) Field of Classification Search .................. 198/839, 198/845
See application file for complete search history.

(56) References Cited

U.S. PATENT DOCUMENTS

| | | | | |
|---|---|---|---|---|
| 4,461,378 A | * | 7/1984 | Roth | 198/370.04 |
| 6,588,583 B2 | * | 7/2003 | Trieb | 198/845 |
| 6,640,965 B2 | | 11/2003 | Trieb | |
| 6,935,490 B2 | * | 8/2005 | Trieb | 198/845 |

FOREIGN PATENT DOCUMENTS

EP    1 338 531 B1    7/2004

* cited by examiner

*Primary Examiner*—Mark A Deuble
(74) *Attorney, Agent, or Firm*—Laurence A. Greenberg; Werner H. Stemer; Ralph E. Locher

(57) ABSTRACT

An installation for conveying goods, such as bulk materials, breakdown and overburden materials, mineral substances, and the like, from a loading station to an unloading station has a continuous conveyor belt that is borne by supporting cables, is moved along guide cables, from the loading station to the unloading station, rolls on supporting rollers, and is guided over deflecting drums in the loading and the unloading station. A respective turning device is located downstream of the unloading station and upstream of the loading station, as seen in the movement direction of the conveyor belt, is fastened on supporting frames, is provided for turning the return strand of the conveyor belt. The guide is formed with a helically running guide track for turning the conveyor belt downstream of the unloading station and upstream of the loading station. The guide track here, which is located in the turning device, can be adjusted and secured in position in relation to the supporting frames for adaptation to the given technical requirements, such as the dimensions and the properties of the conveyor belt, the loading to which the conveyor belt is subjected by the goods to be transported, and the like.

11 Claims, 7 Drawing Sheets

INSTALLATION FOR CONVEYING GOODS

CROSS-REFERENCE TO RELATED APPLICATION

This application claims the priority, under 35 U.S.C. § 119, of Austrian patent application A 1855/2007, filed Nov. 15, 2007; the prior application is herewith incorporated by reference in its entirety.

BACKGROUND OF THE INVENTION

Field of the Invention

The present invention relates to an installation for conveying goods, such as breakdown and overburden materials, mineral substances and the like, from a loading station to an unloading station by way of a continuous conveyor belt which is borne by supporting cables, is moved along guide cables, from the loading station to the unloading station, by way of supporting rollers and guided over deflecting drums in the loading station and in the unloading station. The installation further has a respective turning device which is located downstream of the unloading station and upstream of the loading station, as seen in the movement direction of the conveyor belt, is fastened on supporting frames, is intended for turning the conveying-belt strand moving from the unloading station to the loading station (i.e., the return strand) and is designed with a helically running guide track for turning the conveyor belt downstream of the unloading station and upstream of the loading station.

Such an installation is described, by way of example, in my earlier, commonly assigned U.S. Pat. No. 6,640,965 B2 and its counterpart European patent EP 1338531 B1. There, the turning devices comprise a supporting framework, which contains the helical guide tracks for turning the conveyor belt through approximately 180°. As the conveyor belt moves through these turning devices, however, the predetermined dimensions and the material properties of the conveyor belt, and also the loading which occurs on account of the articles conveyed, thus give rise to high frictional forces and a resulting high level of wear to the guide tracks since the guide tracks, which are located in the turning devices, each have a predetermined profile, for which reason the profile of the guide tracks cannot be adapted to the given technical features of the conveyor belt and/or of the articles conveyed.

SUMMARY OF THE INVENTION

It is accordingly an object of the invention to provide an installation for conveying goods, which overcomes the disadvantages associated with the heretofore-known devices and methods of this general type and which provides for a turning device that avoids the above-noted disadvantage of prior turning devices.

With the foregoing and other objects in view there is provided, in accordance with the invention, an installation for conveying goods from a loading station to an unloading station, comprising:

a continuous conveyor belt borne by supporting cables and formed with supporting rollers for rolling along guide cables between the loading station and the unloading station, and wherein the conveyor belt is guided over deflecting drums in the loading station and in the unloading station;

turning devices respectively disposed downstream of the unloading station and upstream of the loading station, as seen in a movement direction of the conveyor belt, the turning devices being mounted on supporting frames and configured to turn a return strand of the conveyor belt moving from the unloading station to the loading station;

the turning devices including a helically running guide track for turning the conveyor belt downstream of the unloading station and upstream of the loading station, the guide track being adjustably mounted and securable in position relative to the supporting frames, for adaptation to given technical requirements, such as the dimensions and material properties of the conveyor belt and a loading to which the conveyor belt is subjected by the goods to be transported.

In other words, the objects of the invention are achieved in that the guide track, which is located in the turning device, can be adjusted and secured in position in relation to the supporting frames for adaptation to the given technical features, such as the dimensions and the properties of the conveyor belt, the loading to which the conveyor belt is subjected by the articles on it, and the like.

The turning device is preferably configured with at least two supporting frames, preferably with at least three supporting frames, which bear the guide track. The invention preferably provides, between the adjacent supporting frames, in each case two supporting bars for the guide track which extend in the longitudinal direction of the conveyor belt, it being possible for the ends of the these supporting bars to be adjusted and secured in height on the supporting frames. Spaced-apart supporting panels for the guide track are preferably fastened on two associated supporting bars.

According to a preferred embodiment, the supporting panels are designed with a more or less circular cutout, along the periphery of which is located the guide track in the form of more or less diametrically arranged guides, such as rails, rods or the like, these guides running more or less helically. In this case, in the region of the turning device, the guide cables assigned to the conveying-belt strand moving back to the loading station are spaced apart by the distance of the guides. Furthermore, at the beginning and at the end of the turning device, the conveying-belt strand moving back to the loading station is preferably assigned directing means, such as supporting strips or the like, which directs the supporting rollers from the guide cables to the guides.

Other features which are considered as characteristic for the invention are set forth in the appended claims.

Although the invention is illustrated and described herein as embodied in installation for conveying goods, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF DRAWING

DETAILED DESCRIPTION OF THE INVENTION

Figure 1:
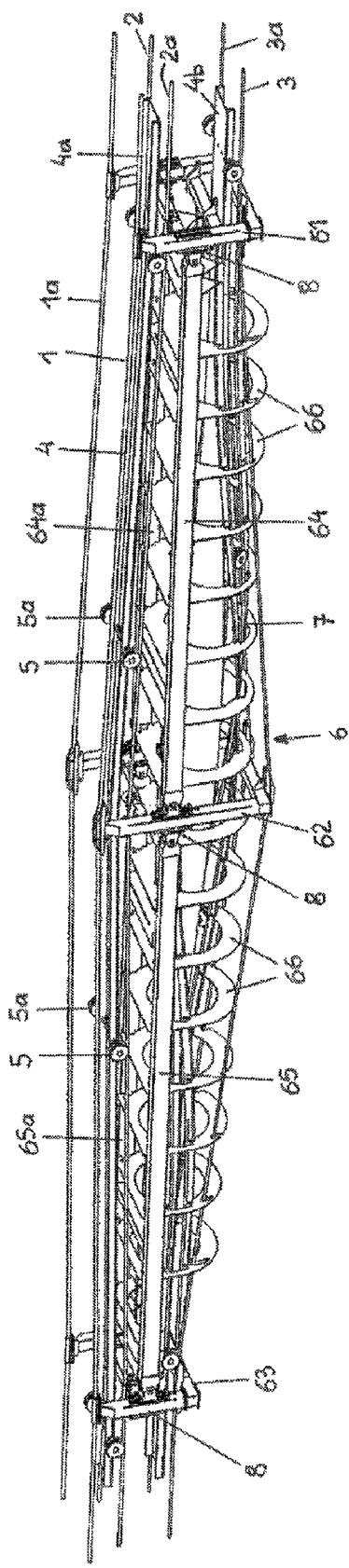
FIG. 1 is a perspective view illustrating a turning device according to the invention.
Figure 1A:
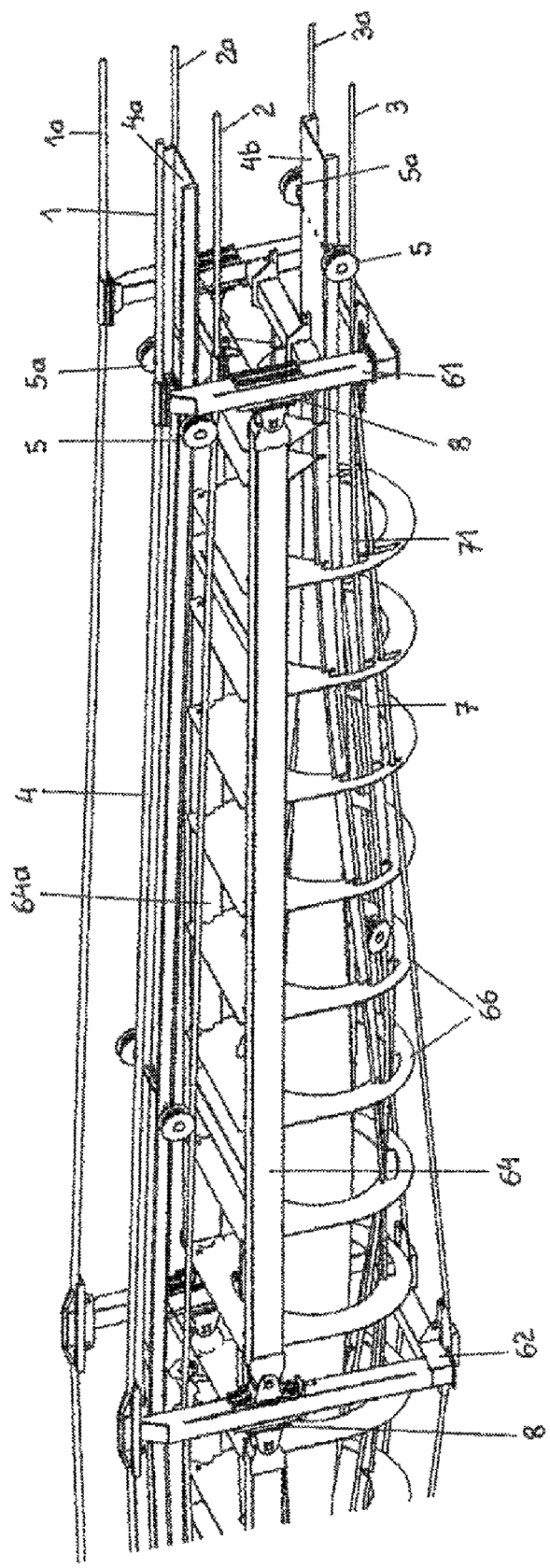
FIG. 1A is a perspective view, on an enlarged scale relative to FIG. 1, of the front part of the turning device, as seen in the movement direction of the return strand of the conveyor belt moving from the unloading station to the loading station.

Referring now to the figures of the drawing in detail and first, particularly, to FIGS. 1 and 1A, there is illustrated a turning device for that strand of the conveyor belt of an installation for conveying goods which moves from the unloading station to the loading station (i.e., the return strand). As can be seen from FIGS. 1 and 1a, this conveying installation contains two supporting cables 1 and 1a which, over the course of this installation, bear in each case two guide cables 2, 2a and 3, 3a by means of spaced-apart supporting frames. A conveyor belt 4 is moved along these guide cables 2, 2a and 3, 3a, the top strand 4a of the conveyor belt being moved along the two top guide cables 2, 2a and the bottom strand 4b being moved along the two bottom guide cables 3, 3a. For this purpose, the conveyor belt 4 is designed with supporting rollers 5, 5a, which roll along the guide cables 2, 2a and 3, 3a.

The turning device 6 has three supporting frames 61, 62 and 63, which are fastened on the supporting cables 1 and 1a. The turning device 6 also has supporting bars 64, 64a and 65, 65a which extend between the three supporting frames 61, 62 and 63 and on which are fastened supporting panels 66 for a guide track 7 which runs helically along the turning device 6, the supporting panels being spaced apart from one another in the movement direction of the conveyor belt 4. The guide track 7 comprises two diametrically arranged pairs of guide rails which extend helically, within cutouts located in the supporting panels 66, in the movement direction of the bottom strand 4b of the conveyor belt 4.

As seen in the movement direction of the bottom strand 4b of the conveyor belt 4, the supporting rollers 5, 5a along the two bottom guide cables 3, 3a run into the turning device 6, and pass on to the guide rails. Further along the movement path, the bottom strand 4b of the conveyor belt 4 is turned through approximately 90° in the counter-clockwise direction on account of the helical course of the two guide rails, and it is more or less vertical in the region of the second supporting frame 62. Further along the movement path of the bottom strand 4b of the conveyor belt 4, this is turned through a further approximately 90°, on account of the helical course of the guide rails, between the second supporting frame 62 and the third supporting frame 63, as a result of which it has been turned through 180° in the region of the third supporting frame 63, in which case its loading surface is directed upward. The supporting rollers 5, 5a then run on to the two bottom supporting cables 3, 3a again and the bottom strand 4b of the conveyor belt 4 is moved in the upwardly directed position to the loading station. A second such turning device is provided upstream of the loading station in which the bottom strand 4b of the conveyor belt 4 is turned, once again, through 180°, as a result of which it can be guided by way of its planar bottom surface over the deflecting drum located in the loading station.

The above configuration of the conveying installation for goods having a continuous conveyor belt 4 which is guided over deflecting drums in the loading station and in the unloading station, a respective turning device 6 being provided downstream of the unloading station and upstream of the loading station, as seen in the movement direction of the conveyor belt 4, and the above configuration of the turning device 6 belong to the state of the art.

Depending on the articles or goods conveyed, such conveying installations make use in each case of conveyor belts with different dimensions and with different mechanical properties. In addition, different materials also give rise to different loading. On account of these different operating conditions, the prior turning devices do not meet the technical requirements because the guide tracks are arranged in a rigid manner, as a result of which the operation of such installations gives rise to high frictional forces and, as a result, pronounced levels of wear, for which reason prior art turning devices of this type have a relatively short service life.

In order to avoid this disadvantage, the turning device according to the invention has been further developed in relation to the known prior art to the extent where the guide track can be adjusted in position so as to allow adaptation to the given technical features of the relevant turning device. For this purpose, the invention provides adjusting devices 8 by way of which the supporting bars 64, 64a, 65 and 65a, which are located between the supporting frames 61, 62, 63, can be adjusted in relation to the supporting frames 61, 62, 63. As a result, the supporting panels 66, and thus the guide track 7, can be adjusted to the extent where low-friction and thus low-wear movement and turning of the bottom strand 4b of the conveyor belt 4 takes place in the turning device 6.

Figure 2A:
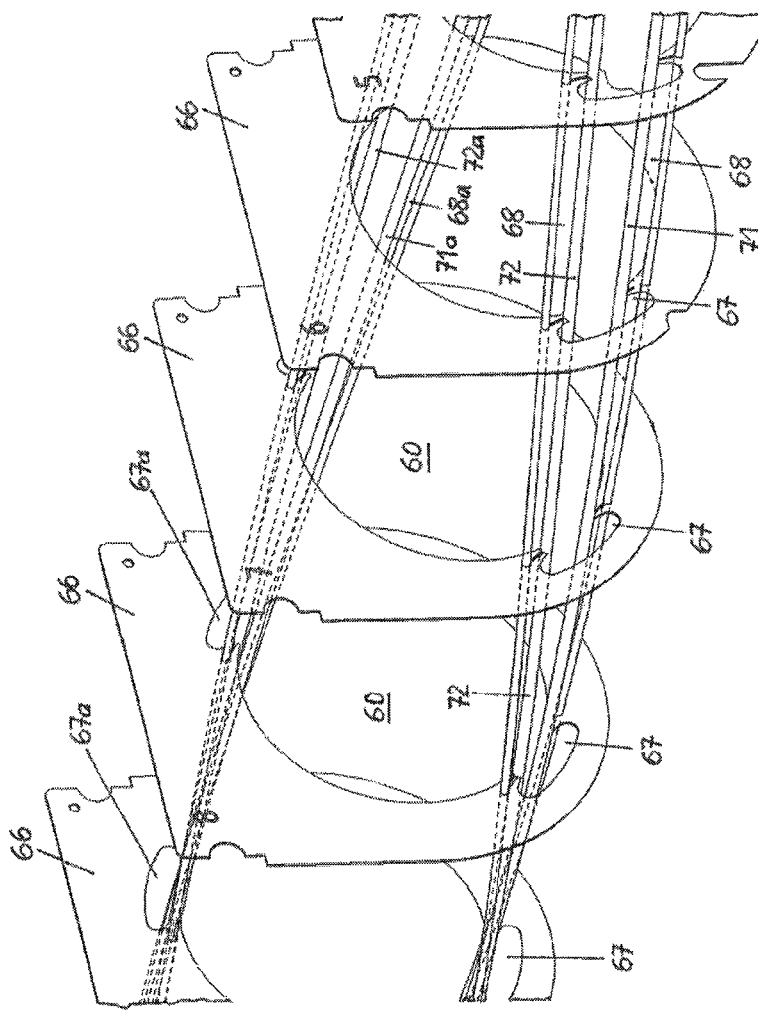
FIG. 2A is a perspective view a detail of the turning device.
Figure 2:
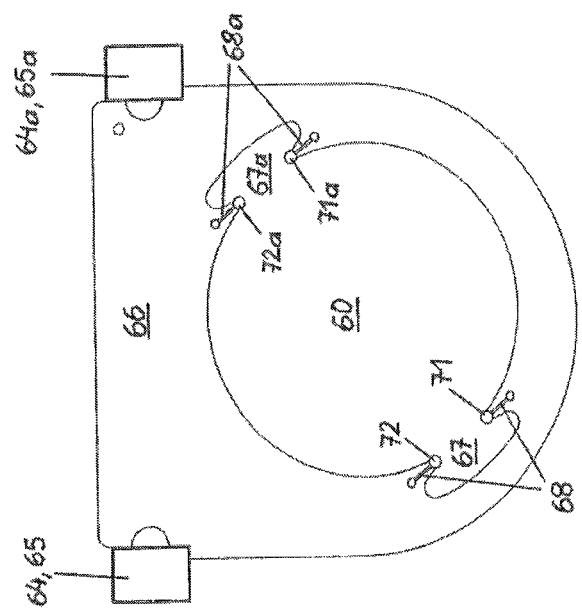
FIG. 2 is a plan view onto a detail of the turning device.

As can also be seen from FIG. 2, the supporting panels 66, which are fastened on the supporting bars 64, 64a, 65, 65a, are designed with a circular cutout 60, along the periphery of which are located diametrically arranged, more or less elliptical cutouts 67, 67a which are each assigned two pairs of guide rails 71, 72 and 71a, 72a, which form guides for the supporting rollers 5 and 5a located therebetween. Over the course of the movement path, these cutouts 67, 67a are rotated in relation to one another in each case such that the guide rails 71, 72 and 71a, 72a run helically. In order to reinforce this guide track, furthermore, connecting cross-pieces 68, 68a are located in each case between the supporting panels 66. On account of this design of the guide track, the latter can be changed by way of the adjusting devices 8 so as to allow adaptation to the particular technical features in order to achieve low-friction guidance.

Figures 3, 3A:
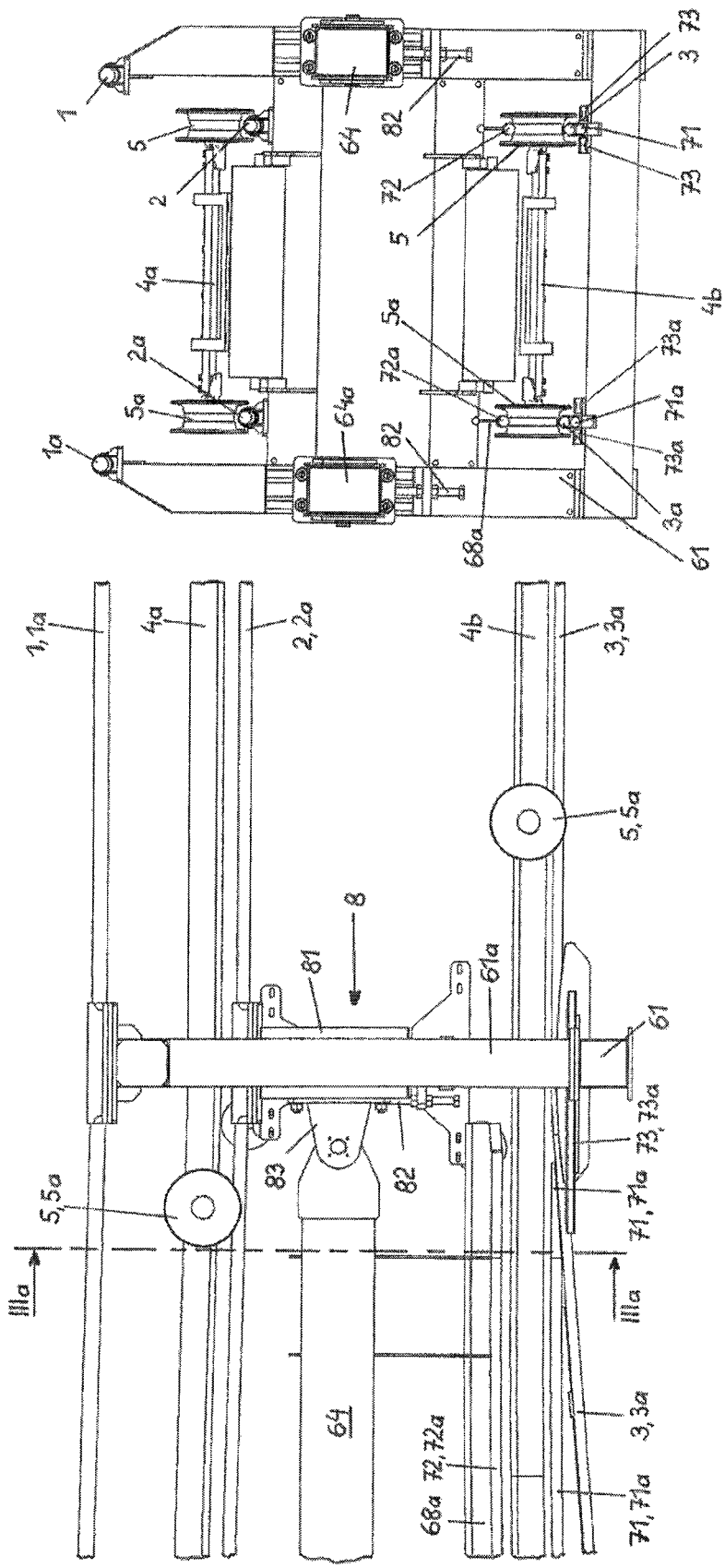
FIG. 3 is a side view of a front part of this turning device, as seen in the movement direction of the conveying-belt strand moving from the unloading station to the loading station, in a first operating position of the conveyor belt.
FIG. 3A is a section taken along the section line IIIa-IIIa in FIG. 3 and viewed in the direction of the arrows.

As can be seen from FIGS. 3 and 3A, the adjusting device 8 provided for the supporting frame 61 is formed with a sleeve 81 which can be displaced vertically along one of the vertical bars 61a of the supporting frame 61 and can be adjusted vertically by means of a spindle 82. The sleeve 81 is provided with a link plate 83, on which the associated end of the supporting bar 64 is articulated. Rotation of the spindle 82 can thus adjust the height at which the supporting bar 64 is articulated.

It is thus possible to adjust the height of all the points at which the supporting bars 64, 64a and 65, 65a are articulated in relation to the supporting frames 61, 62 and 63, as a result of which the supporting panels 66 and thus the guide track 7 can be adjusted to achieve low-friction and thus low-wear guidance of the supporting rollers 5, 5a along the helically running guide rails 71, 72 and 71a, 72a.

Figures 4, 4A:
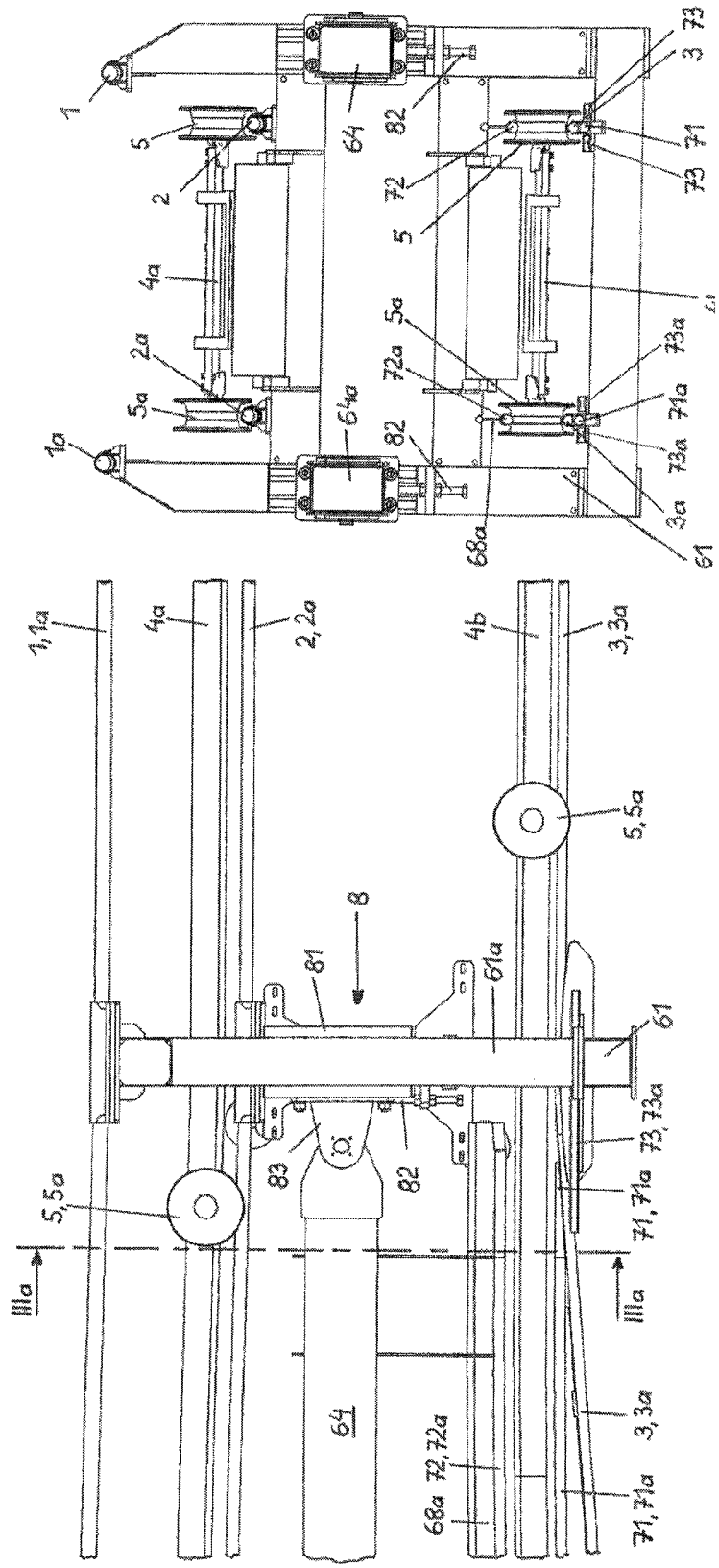
FIG. 4 is a side view of the front part of the turning device, as seen in the movement direction of the conveying-belt strand moving from the unloading station to the loading station, in a second operating position of the conveyor belt.
FIG. 4A is a section taken along the section line IVa-IVa in FIG. 4 and viewed in the direction of the arrows.

FIGS. 3 and 3A illustrate such a position of the strand 4b of the conveyor belt 4, the strand moving back from the unloading station to the loading station, in which the supporting rollers 5, 5a are still located on the associated guide cables 3, 3a. As the bottom strand 4b of the conveyor belt 4 moves on further, as illustrated in FIGS. 4 and 4A, the rims of the supporting rollers 5, 5a run onto directing means, such as supporting strips 73, 73a, as a result of which the supporting rollers 5, 5a are raised off from the guide cables 3, 3a. Further along the movement of the strand 4b, the guide cables 3, 3a can be deflected laterally downwards and the supporting rollers 5, 5a run onto the guide rails 71, 72 and 71a, 72a, by means of which the bottom strand 4b of the conveyor belt 4 is turned through approximately 90° as far as the second supporting frame 62. This position of the strand 4b running back to the loading station is illustrated in FIGS. 5 and 5A.

Figures 5, 5A:
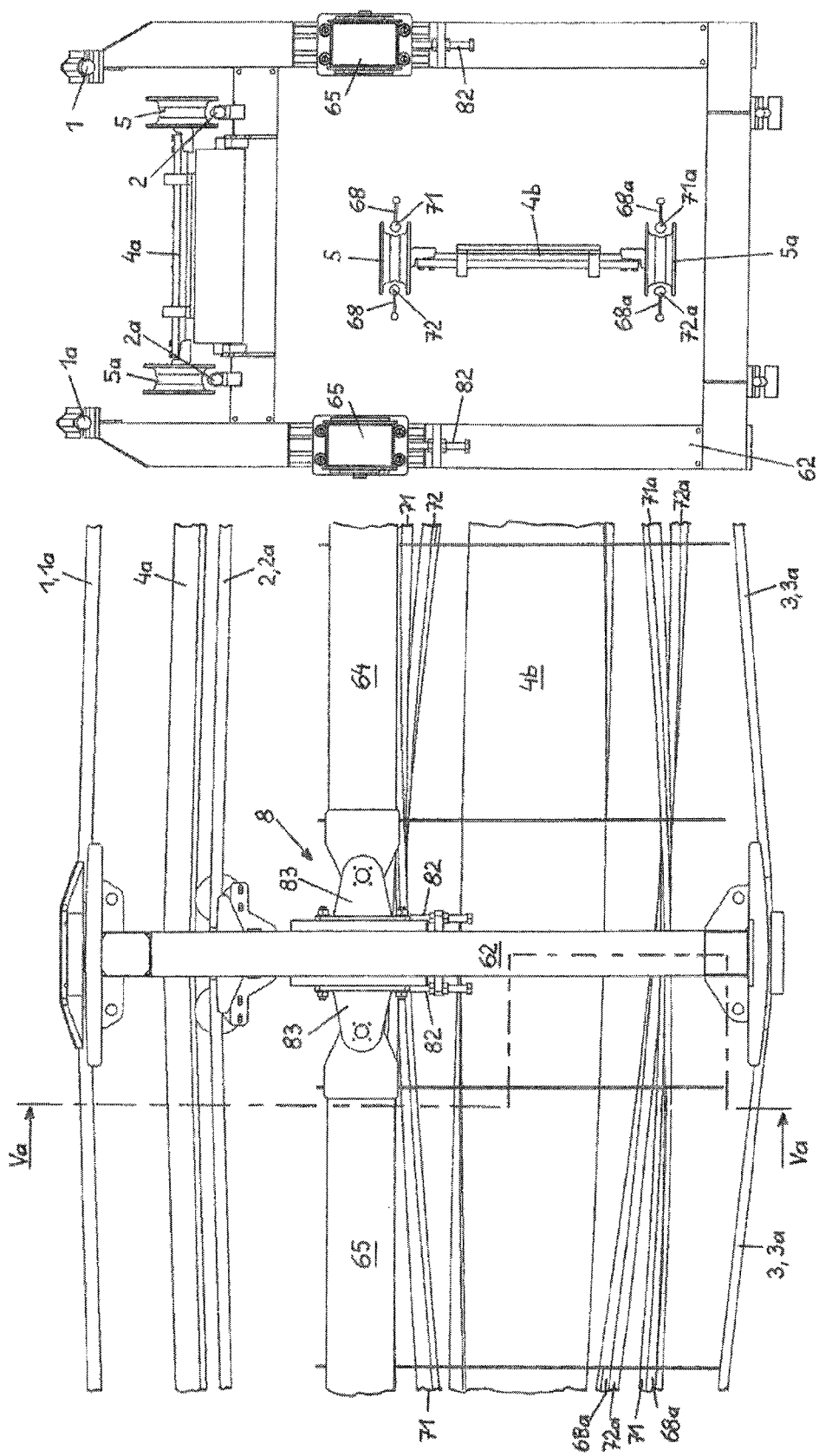
FIG. 5 is a side view of the central part of the turning device, as seen in the movement direction of the conveying-belt strand moving from the unloading station to the loading station.
FIG. 5a is a section taken along the section line Va-Va in FIG. 5 and viewed in the direction of the arrows.

As is illustrated in FIG. 5A, the bottom strand 4 of the conveyor belt 4 is located more or less vertically within the second supporting frame 62, the aim being for the supporting rollers 5, 5a to be located with play between the guide rails 71, 72 and 71a, 72a of the turning device 6, since this then achieves the lowest possible level of friction which is desired as the strand 4b moves through the turning device 6. This position of the conveyor belt 4 is achieved by the adjustment of the supporting panels 66 on account of the adjustment of the supporting bars 64, 64a, 65 and 65a by way of the adjusting devices 8, which are provided on all three supporting frames 61, 62, 63.

Figures 6, 6A:
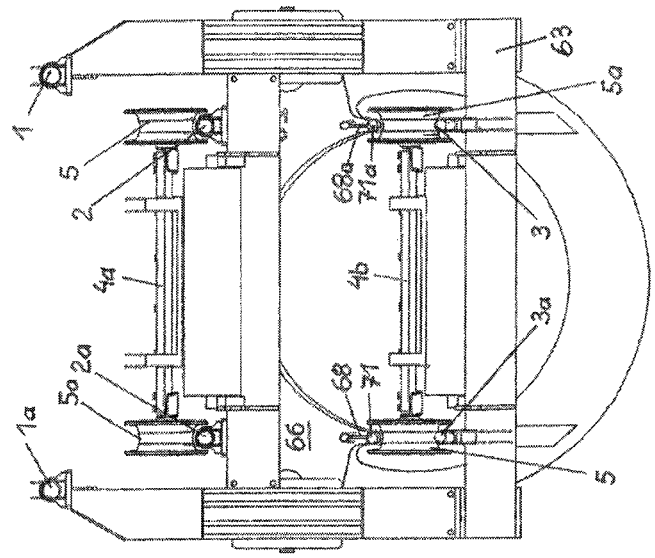
FIG. 6 is a side view of the rear part of the turning device, as seen in the movement direction of the conveying-belt strand moving from the unloading station to the loading station.
FIG. 6A is a section taken along the section line Via-Via in FIG. 6 and viewed in the direction of the arrows.

With reference to FIGS. 6 and 6A, the bottom strand 4b of the conveyor belt 4 has been turned through 180° in the region of the third supporting frame 63, as a result of which the loading surface of the conveyor belt is directed upward. In this region, the supporting rollers 5, 5a pass back again from the guide rails 71, 72 and 71a, 72a onto the second guide cables 3, 3a, along which they are then guided up to the second turning device, which is located upstream of the loading station.

In a case of the above exemplary embodiment of the conveying installation according to the invention, the turning device 6 provided downstream of the unloading station is fastened on the supporting cables 1, 1a of the conveying installation. In the same way, it is also possible for the turning device 6 located upstream of the loading station to be fastened on the supporting cables. As an alternative, it is possible for one or both turning devices to be provided on supporting frameworks located in the regions of the unloading station and of the loading station.

It will be understood that it is also possible to provide a greater number of supporting frames.

In the exemplary embodiment described here, the guide track, which is located in the turning device, is formed by two helically running pairs of guide rods. It is also possible, however, for the guide track to be of some other design. The primarily important factor for the configuration according to the invention is that the guides located in the turning device can be adjusted in position in order thus to provide for adaptation to the given technical requirements in order to achieve guidance with the lowest possible level of friction resistance, and thus the lowest possible power requirement, and the lowest possible level of wear.

The invention claimed is:

1. An installation for conveying goods from a loading station to an unloading station, comprising:
   a continuous conveyor belt borne by supporting cables and formed with supporting rollers for rolling along guide cables between the loading station and the unloading station, and wherein said conveyor belt is guided over deflecting drums in the loading station and in the unloading station;
   turning devices respectively disposed downstream of the unloading station and upstream of the loading station, as seen in a movement direction of the conveyor belt, said turning devices being mounted on supporting frames and configured to turn a return strand of the conveyor belt moving from the unloading station to the loading station;
   said turning devices including a helically running guide track for turning the conveyor belt downstream of the unloading station and upstream of the loading station; and
   two supporting bars for said guide track extending between mutually adjacent said supporting frames, said supporting bars extending in a longitudinal direction of said conveyor belt and having ends height-adjustably secured to said supporting frames for adjustably mounting and securing said guide track in position relative to said supporting frames, for adaptation to given technical requirements.

2. The installation according to claim 1, wherein the given technical requirements include a dimension and property of said conveyor belt and a loading to which said conveyor belt is subjected by the goods to be transported.

3. The installation according to claim 1, wherein said conveyor belt is configured to transport bulk materials, breakdown or overburden materials, and mineral substances.

4. The installation according to claim 1, wherein each said turning device includes at least two said supporting frames bearing said guide track.

5. The installation according to claim 1, wherein each said turning device includes at least three said supporting frames bearing said guide track.

6. The installation according to claim 1, which comprises spaced-apart supporting panels for said guide track mounted to two associated supporting bars.

7. The installation according to claim 6, wherein said supporting panels are formed with substantially circular cutouts having a periphery, and said guide track is formed of two more or less diametrically disposed guides running helically along said periphery of said cutouts.

8. The installation according to claim 7, wherein said guides of said guide track are pairs of rails or rods.

9. The installation according to claim 7, wherein, in a region of said turning device, said guide cables assigned to the return strand of the conveyor belt moving back to the loading station, are spaced apart by a distance between said guides.

10. The installation according to claim 1, wherein each said turning device has a beginning and an end and wherein the return strand of the conveyor belt moving back to the loading station is assigned directing means at said beginning and said end for directing said supporting rollers between said guide cables and said guides.

11. The installation according to claim 10, wherein said directing means are formed as supporting strips.

* * * * *